United States Patent [19]
Whitridge et al.

[11] Patent Number: 6,119,179

[45] Date of Patent: Sep. 12, 2000

[54] TELECOMMUNICATIONS ADAPTER PROVIDING NON-REPUDIABLE COMMUNICATIONS LOG AND SUPPLEMENTAL POWER FOR A PORTABLE PROGRAMMABLE DEVICE

[75] Inventors: Frederick W. Whitridge, Greenwich; Brendan F. Hemingway, New Haven, both of Conn.

[73] Assignee: PDA Peripherals Inc., Greenwich, Conn.

[21] Appl. No.: 09/143,188

[22] Filed: Aug. 28, 1998

[51] Int. Cl.[7] .............................. G06F 13/14; G06F 3/00; H04M 1/00

[52] U.S. Cl. ........................ 710/72; 455/556; 455/557; 455/572; 235/380; 235/472.01; 320/114; 375/222

[58] Field of Search ........................... 320/114; 235/380, 235/472.01; 375/222; 455/556, 557, 572; 709/302; 710/72

[56] References Cited

U.S. PATENT DOCUMENTS

| | | | |
|---|---|---|---|
| 4,697,281 | 9/1987 | O'Sullivan | 455/557 |
| 5,468,948 | 11/1995 | Koenck et al. | 235/472 |
| 5,524,134 | 6/1996 | Gustafson et al. | 455/410 |
| 5,606,594 | 2/1997 | Register et al. | 455/550 |
| 5,625,673 | 4/1997 | Grewe et al. | 455/556 |
| 5,754,655 | 5/1998 | Hughes et al. | 380/24 |
| 5,907,815 | 5/1999 | Grimm et al. | 455/557 |
| 5,920,177 | 7/1999 | Davis | 320/114 |
| 5,983,073 | 11/1999 | Ditzik | 455/11.1 |
| 6,035,214 | 3/2000 | Henderson | 455/556 |

*Primary Examiner*—Thomas C. Lee
*Assistant Examiner*—Albert Wang
*Attorney, Agent, or Firm*—Brown Raysman Millstein Felder & Steiner LLP

[57] ABSTRACT

A portable adapter that provides non-repudiable telecommunications services to bar-code reading hand-held computers and palm-top or tablet-type mobile computers is disclosed. The adapter provides supplemental power supply and processing capacity that supports API communications functions, such as interactive voice recognition, conference calling, data encryption, VoIP packetization and other signal-format conversions that are not implemented on mobile computers. In particular, the device automatically logs IP packet identifiers and DOV dialing and status signals, without the user having access to edit this information, thereby providing a "non-repudiation" record of all communications. The adapter also supports intensive use of the host computer's serial port by supplementing the power available from the host computer's battery, or replacing that battery with a connector. For plant inspection and inventory auditing, ground-based cellular communications are implemented for supporting on-site work, including conference calling to discuss apparent pilferage or imminent safety hazards, and removable WORM recording media for documenting these discussions. For repair shop use, a standard phone jack or 10-base-T connector allows the device to upload engine test-data, with reports or estimates dictated by the mechanic to the repair shop's LAN server. For hospital use, the device includes removable WORM media for logging patient test results and examination reports. The hospital device also uses a dedicated local-area RF or IR transmitter, with location-specific encryption, to protect the privacy of lab reports received by the device, and to limit use of these devices to hospital's own premises.

4 Claims, 3 Drawing Sheets

| IP Version (4) | Header Length (4) |
|---|---|
| Total of Service (8) ||
| Total Length (16) ||
| Identifier (16) ||
| Flags (3) | PDU Fragment Offset (13) |
| Time to Live (8) ||
| Protocol (8) ||
| Header Checksum (16) ||
| Source Address (32) ||
| Destination Address (32) ||
| Options and Padding (Variable) ||
| Data (Variable) ||

TELECOMMUNICATIONS ADAPTER PROVIDING NON-REPUDIABLE COMMUNICATIONS LOG AND SUPPLEMENTAL POWER FOR A PORTABLE PROGRAMMABLE DEVICE

BACKGROUND OF THE INVENTION

1. Field of the Invention

The present invention pertains to hand-held computers, such as personal data assistants (PDAs). More particularly, the present invention is directed to providing automated telecommunications for mobile computers.

2. Discussion of Related Art

Desktop computers are designed to be used at a desk. Portable or "laptop" computers are designed to be carried from place to place, but are used in essentially the same way as desktop computers, with the computer device resting on some fixed surface. In contrast, hand-held or "mobile" computers are computers designed to be used on the move. There are three common configurations of these mobile computers: pistol-grip computers, such as those made by Telxon™; keyboard-based palmtop computers such as the Psion Organizer™; and tablet computers, such as Apple's Newton™ or 3Com's Palm Pilot™ that provide an iconic "GUI" interface and accept handwritten information. The latter two, particularly the tablet computers, are also referred to as "PDAs".

Hand-held computers are widely used for inventory control, in the publishing and retail grocery businesses, for example, and often share a pistol-shaped housing with devices that read and store bar-code information. Palmtop computers are essentially desktop computers including the conventional features of the desktop computer: display, keyboard, etc., but greatly reduced in size and usually housed in an open-faced case, rather than the "clamshell" folding case used for the larger, "laptop" computers. Tablet computers are similar to the palmtop computers in size, but they are computerized, paper-less note pads: the user 'writes' on the tablet with a stylus, and the tablet interprets the movement of the user's stylus as commands and data. The tablet computers are often GUI driven, so that the stylus can be used to actuate GUI "button" icons, even operate a GUI keyboard.

All mobile computers are designed to be as lightweight as possible. This is particularly problematic for power supply design, and output devices, generally, require substantial power supply capacity. Having very little power to spare, these mobile computers have spawned a flood of peripheral and accessory devices that offer various functions expanding the built-in input and output (I/O) capabilities of mobile computers as local area network (LAN) and wide-area network (WAN) telecommunications terminals, as well as, printer terminals. For example, U.S. Pat. Nos. 5,606,594 and 5,625,673 disclose communications accessories that provide an enclosure for and add functions to a PDA unit. However "accessories", unlike peripheral devices, do not have the computing power to provide an application program interface (API) for the mobile host computer.

With the rise of the Internet and the advent of Voice-over-IP (VoIP) telephony, providing computer-based telecommunications now demands more processing capacity than ever before. In addition to the basic serial data-over-voice (DOV) connectivity work done by conventional modems that are available as accessories, digital call-control features such as conference calling require API support. Also, conversions turning audio and other signals into bit streams, bit streams into bytes and bytes into IP packets, as well as the reverse process turning received IP packets back into sound, text or images, require API support. Mobile computers simply do not have the computing power to provide the API support nor the power needed to support the data speeds and bandwidths required for initiating and maintaining the communications services required for many current IP applications. Audio and video, in general, and VoIP audio in particular, have stringent real-time performance standards and require API support for their specialized high-speed control and data conversion functions.

SUMMARY OF THE INVENTION

In accordance with the present invention, non-repudiable telecommunications services are provided for mobile computers by a communications adapter having telecommunications server operating system and applications interface software. Telecommunications services are provided to the user by the adapter through a user interface (UI) client installed on the mobile host computer.

The UI client installed on the mobile computer cooperates with a server operating system in the adapter to execute and support API communications functions. In particular embodiments these functions include voice mail, voice recognition, dictation, call logging and conferencing, as well as encryption, IVR and data-format conversions. In particular embodiments, the adapter provides the computers the power supply and processing capacity needed for interactive voice recognition, conference calling, data encryption and VoIP packetization, capacity that the computers themselves lack, as well as the connections and interfaces for communication links that are not implemented in standard mobile computers.

To use the adapter for telecommunications, a mobile computer having the interface software installed thereon is connected to the adapter. A communications link is connected to the adapter, if necessary. In particular embodiments the communications link is a PSTN line or a LAN connection, a cellular or wireless telephone set, or a telephone line. The adapter is then activated, which activates the UI on the mobile host computer, waking up the host computer. The user selects the interface module for use with a link connected to the adapter and directs the UI to send an appropriate control message or messages to the adapter's call-processing software. In particular embodiments the interfaces support PSTN, PPP, VoIP, DTMF or video communications, respectively.

In one particular embodiment, the mobile computer is connected to the power supply of the adapter by replacing a battery in the mobile computer with a connector shaped like the battery. In another embodiment the adapter connects to the power supply of the mobile computer through a connector provided by the computer.

In a particular embodiment, the adapter stores data received and transmitted by the adapter as part of a non-repudiable communications log. Preferably, the mobile computer is provided read-only access to communications payload data stored in the log file through the UI installed on the mobile computer. In a further particular embodiment, the adapter includes a record button that selects a dictation interface module which logs the dictation event and converts the spoken information to a data format.

The conventional computer peripheral devices designed for desktop and laptop computers are simpler and have less computing power than their host computer. The present invention, instead is more specialized and has more computing power than its host computer, providing security and connectivity applications programming that cannot be implemented on the host computer.

BRIEF DESCRIPTION OF THE DRAWINGS

The features and advantages of the present invention will be better understood when the detailed description of a preferred embodiment given below is considered in conjunction with the figures provided, wherein.

In these figures, like structures are assigned like reference numerals.

DESCRIPTION OF PREFERRED EMBODIMENTS

Figure 1A:
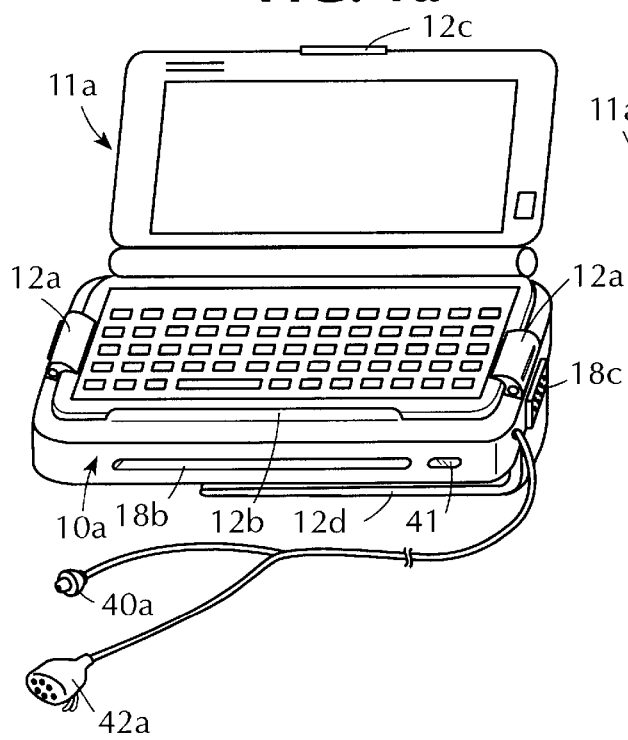
FIGS. 1a and 1b are two perspective views of a mobile computer adapter for medical use in accordance with a first embodiment of the present invention.
Figure 1B:
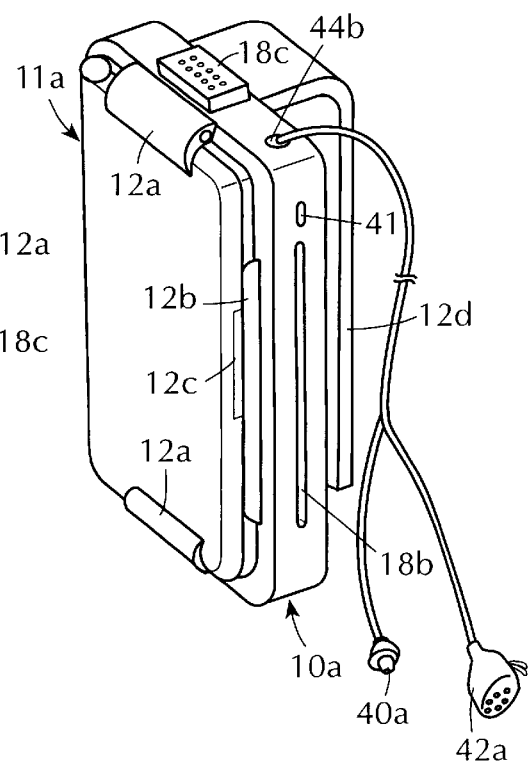

A telecommunications adapter 10a for hospital use is shown in FIG. 1a and FIG. 1b. The adapter 10a is attached to a keyboard-based palmtop computer 11a by side clips 12a and a front ledge 12b that also accommodates the latch 12c on the lid of the palmtop computer's case to hold the case shut, as shown in FIG. 1b. The adapter also has a belt hook 12d for hands-free operation of the adapter. The adapter 10a also has a slot for loading dictation minidiscs 18b and a "RECORD/PLAYBACK" button 18c for use in recording voice messages on the removable discs, which provide storage and logging for patient test results transmitted to the adapter as well as examination reports dictated and stored or transmitted for typing by the doctor or intern.

Figure 4:
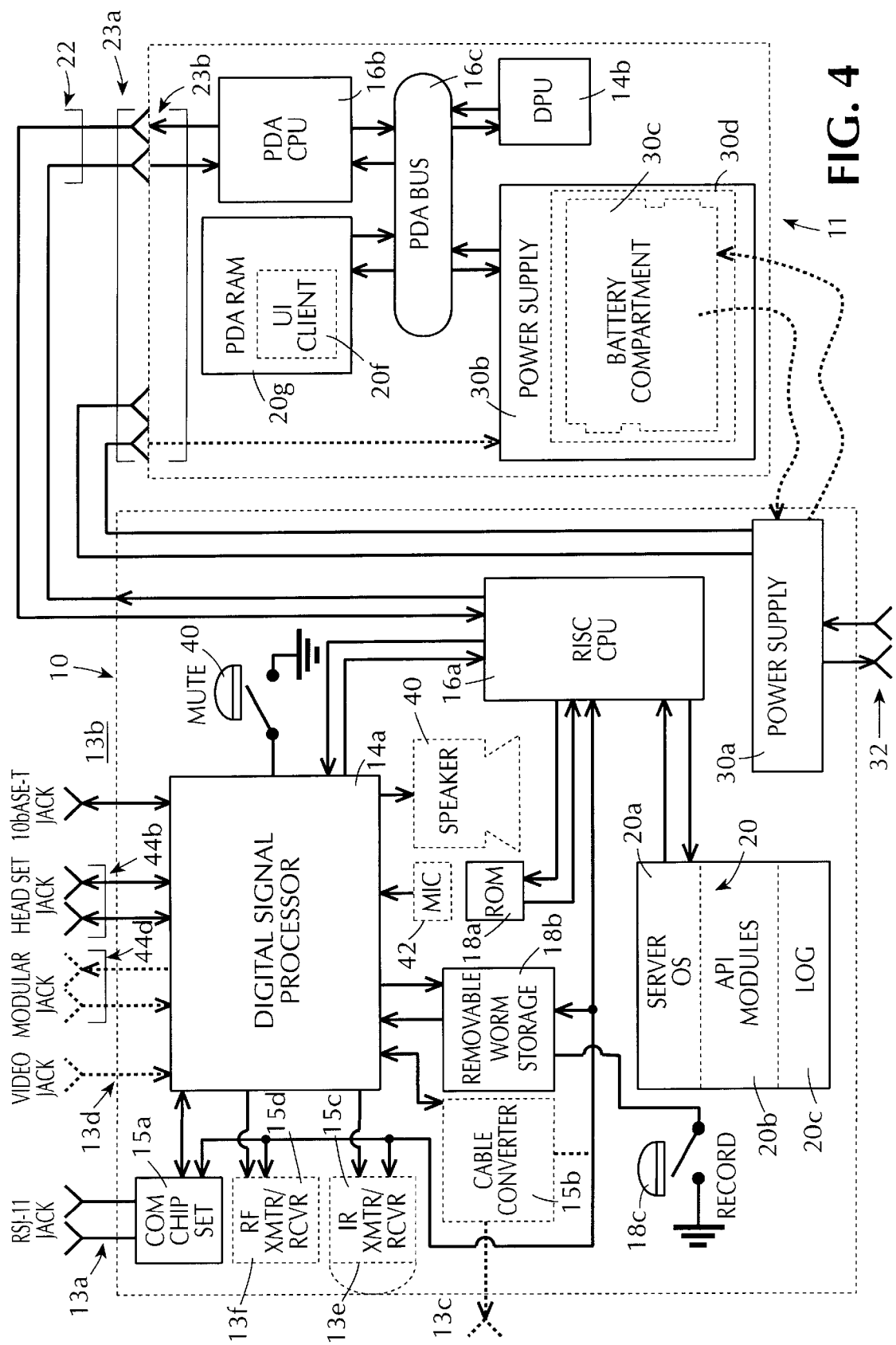
FIG. 4 is a schematic block diagram of call-processing apparatus in accordance with the present invention.

With reference to the general schematic provided in FIG. 4, using the keypad and screen of the palmtop computer 11a, the UI program 20f installed in the RAM memory 20g of the palmtop's CPU 16b provides an interactive communications interface and personal phone book so that an intern wearing the device shown in FIG. 1a and FIG. 1b can also use it as a cordless telephone, using an ear piece 40 and a miniature tie-tack microphone 42a or a headset 40b, 42b. However, the digital audio input provided by the tie tack 42a or headset 42b may also be used to provide IVR control of the cordless telephone. The IVR feature is activated by an IVR activation switch 41 that also controls audio muting, storing muted incoming signals to a voice-mail file as digital audio with data attachments, if any, to prevent untimely communications from distracting medical staff. With communications formatting and encryption, and IVR voice input, being processed by the adapter 10 the PDA CPU 16b remains continuously available for the user-directed tasks of retrieving stored Physician's Desk Assistant data on dosage or patient histories, and word processing, calculations, or preparing fax or e-mail transmissions, etc. If the hospital's IR or RF infrastructure includes Internet access, VoIP provides the physical professional "chat room" long-distance conferencing with video output on the screen of the mobile computer 11a.

The hospital device shown in FIG. 1a and FIG. 1b uses a dedicated local-area RF or IR transmitter, with location-specific encryption, to protect the privacy of the wireless digital voice communications discussing the lab reports received by the adapter device as well as the transmission in which they were received and any examination report data transmitted by it. As a practical matter, by providing a secure, special-purpose, limited-access server OS that encrypts all communications transmitted by the adapter through an encryption routine such as PGP, using a firmware key that is proprietary to the hospital, so that use of the adapter for wireless communications, though not is dictation function, is limited to the hospital's own premises. This dedicates the adapter for use with the hospital's internal communications infrastructure, discouraging pilferage of such communications devices. Furthermore, this communications traffic is also logged using hospital's encryption key, with read only access provided from the log through the encryption routine API. Thus a copy of material logged by the adapter can be retrieved for use in preparing dictation, but the non-repudiation security of the log is assured.

Figure 2:
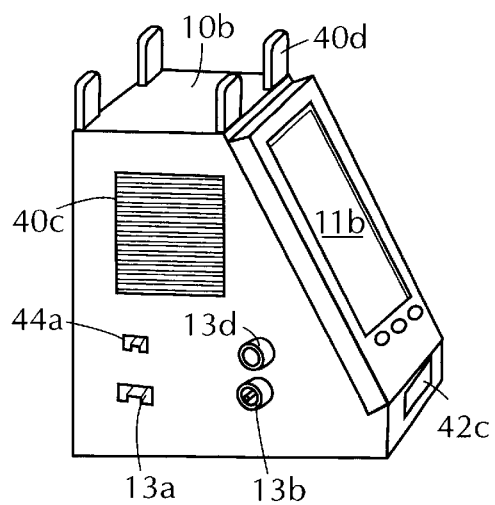
FIG. 2 is a perspective view of a mobile computer adapter for repair shop use in accordance with a second embodiment of the present invention.

In FIG. 2, a telecommunications adapter 10b for use in a repair shop is shown. The adapter 10b is connected to a tablet computer 11b having a GUI touch-screen interface. The adapter 10b is enclosed in a sheet metal housing and provides a loudspeaker 40c and several telecommunications connectors on one side of the housing, leaving the other side and the back of the housing blank for protection against the shop environment. The housing of the adapter 10b also provides a cradle defined by four prongs 40d for holding a handset (not shown). The housing provides a modular jack 44a for the handset and a loudspeaker 40c. In cooperation with a keypad GUI provided by the UI client 20f, in cooperation with the graphics DPU 14b connected to the CPU 16b by the PDA bus 16c and controlled by the GUI software resident in the PDA RAM 20g this loudspeaker 40c can be used to provide DTMF signals to the microphone in the handset, for acoustic dialing of calls using a PSTN line connected to the RSJ-11 jack 13a. Alternatively, the adapter 10b may be used to place VoIP calls using either a dialup gateway through the PSTN connection 13a, or a cable TV gateway connection 13d or a LAN intranet or internet gateway connection 13b.

With communications work, such as the setting up and tearing down a VoIP call and digitizing the voice stream handled by the adapter 10b, the PDA 11b is free to decode and analyze engine test data, retrieve data from parts catalogues, or input a creditcard number for verification. VoIP also provides "whiteboard" interactive drawing ang graphics editing for parties to the VoIP call who have the tablet computers 11b, or the equivalent, full-fledged PC workstation with a digitizer pad.

Figure 3:
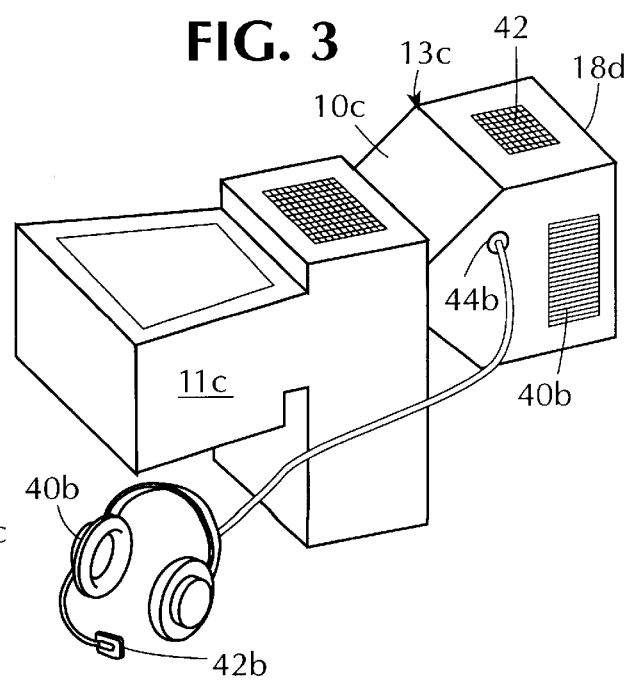
FIG. 3 is a perspective view of a mobile computer adapter for performing inspections in accordance with a third embodiment of the present invention.

For plant inspection and inventory auditing, radio or ground-based cellular communications are implemented by an adapter 10c in a bar code reader 11c that records bar coded location, equipment and crate tags to support an log an inspector's on-site work. The adapter 10c, shown in FIG. 3 includes conference calling and a video packetization API so that the inspector can use a VoIP link to discuss apparent pilferage or imminent safety hazards with both staff and line managers, while simultaneously transmitting a live IP video signal showing the condition being discussed by the inspector. The adapter 10c automatically logs IP packet identifiers and timestamps produced or received by the DSP 14a if VoIP protocols are used for the call, or the dialing and status signals produced by the COM chip set 15a in cooperation with the DSP 14a for output through the direct access array (DAA) that is provided by the chip set 15a for PSTN/DOV calls. However, the IU client software module 20f that provides the PDA CPU 16b access to the adapter's communications facilities, cannot access the storage routine provided by the adapter's server OS 20a, thereby providing a "non-repudiation" record of all communications. Removable WORM recording media 18d are also included for providing non-repudiation documentation of these discussions, in addition to the separate communications log showing the radio transmission times and frequencies, or times and dialed cellular destinations, or the time-stamps, addresses and VoIP-standard audio and video packets transmitted by the adapter 10c.

These PDA adapters 10 comprise a digital signal processor 14a converting voice and keyboard signals input to the PDA adapter 10 by the user to packets for automatic logging by the PDA adapter and transmission on a VoIP link over digital and analog links in the Public Switched Telephone Network (PSTN) communications system using a conventional modulator/demodulator communications interface chip set 15a, or over cable 13c, 15b, or 10-base-T LAN connections 13b, a local IR communications link 13e, 15c, or digital cellular or radio services 13f, 15d, using the corresponding communications formats and protocols. A RISC or CISC-type central processing unit (CPU) 16 provides general-purpose computation, coordination and control operations using a read only memory 18a where boot code, default I/O parameters and operating system kernel is stored. The rest of the adapter's operating system 20a, its log 20c local data files and the applications software supporting communications management API programs 20b are stored in a random access memory (RAM) 20.

The port connector 23a on the PDA adapter 10 communicates with the CPU communications circuitry 22 which carries the messages exchanged between the PDA adapter 10 and the host computer 11. The port facility 23b provided by conventional mobile host computers such as the palmtop 11a or the tablet 11b is a simple, standard serial port, but optical links may be necessary in place of the standard communications circuitry 22 in industrial environments where high emf levels interfere with communications signals. The PDA adapter 10 also provides one or more communications connectors 13 and the corresponding analog interfaces 15a 15b, if any are required. Infra-red (IR) links, or cellular or radio wireless (RF) links rather than a telecommunications line 13a or the 10-base-T connector 13b, etc. may be used to connect highly mobile users to the telecommunications infrastructure, if necessary.

The PDA adapter's power supply 30a has a connector 32 for an external DC step-down transformer (not shown) which supplies power to the adapter 10 when plugged into the local public power grid or mobile power sources. When the transformer is not connected, the adapter is powered either by an internal rechargeable battery pack or standard, single-use battery cells (not shown). Mobile computers' emphasis on high-mobility, low bulk has resulted in many not being designed to even accept external power input, much less support VoIP multimedia communications. To support intensive use of the host computer's serial port 22, 23b, during communications operations, which can reduce operating time available from a PDA such as the Palm Pilot™ by as much as 60%, the power supply of the PDA adapter 10 is connected to the host computer 11 through its edge connector 23b, if possible. Alternatively, the host computer's batteries are replaced by a connector in the original main battery compartment 30d. The connector is shaped like the batteries it replaced and the batteries can then be saved for later use, when the host computer 11 is used apart from the PDA adapter 10.

The CPU 16a of the PDA adapter 10 uses a message-based server operating system (OS) that is native to its own CPU 16a, for maximum operational efficiency. Similarly, the adapter OS 20a also installs a UI client 20f on the host computer 11 that is native to the host computer 11, for that reason.

In the quiescent state the central dispatcher of the server's OS software 20a waits for a message from either the UI client software 20g in the host computer 11 or its own communications interfaces 14a, 15, 20e, 22. When a message is received, a central dispatcher routine in the OS identifies the appropriate API module and/or the signal processing routine to which the message must be forwarded. PSTN audio is processed using the PSTN API module, PPP messages by the PPP API module, IP packets by an IP API module, etc.

Figures 5A, 5B:
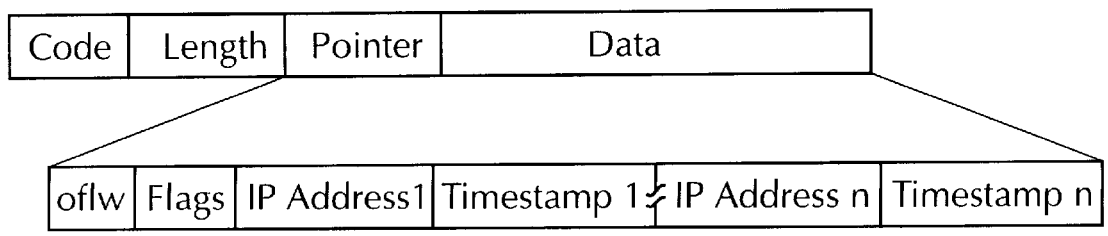
FIG. 5a is a diagram of a standard header used by an IP packet.
FIG. 5b is a diagram of an IP option field where timestamps are implemented.

For example, FIG. 5a shows the header information required by the IP packet transmission protocol. Each packet's "Identifer" field and a "timestamp" in the "Options" field are automatically recorded by the adapter's logging API. This timestamp is automatically supplied to all packets transmitted from the adapter 10 by the DSP 14a. On the Internet, each IP module where the timestamp option is active records its address and the current time in the header of each packet it forwards, as shown in FIG. 5b. Thus the headers of incoming packets will also have respective identifiers and timestamps that are copied to the log 20c by the adapter's logging API.

During PSTN communications, the dial tone, circuit busy, number busy and other network signals are received and processed by the chip set 15a.

The call-processing module then executes the requested communication operation on an applications-layer (API) level using the adapter's telecommunications applications software 20b and the hardware and firmware resources of the DSP 14a. The DSP acts as a high-speed, special-purpose adjunct to the RSC CPU 16a for minimizing the burden of encryption and formatting on the CPU that executes the adapter's server OS 20a and its API programs 20b.

A Digital Signal Processor (DSP) 14a handles most signal formatting, and signal control functions are provided by the API modules, as is known in the art. Internal modules within the DSP also generate signal control messages which they pass back to the server OS 16a executing in the CPU 16a of the PDA adapter 10. The server OS 16a sends interface control messages through the connector on the adapter 23a and the port 23b on the mobile host computer 11 to the user, using the UI client software. Alternatively, those control messages are communicated to the user by the speaker 40 in the PDA adapter, using the IVR utility routines provided by the DSP 14a.

The server OS program 20a, particularly the OS kernel stored in the ROM 18a, automatically records the signal format indicia processed by the DSP 14a, such as IP packet identifiers and DOV or PSTN dialing and status signals, into the log 20c. Because the logging API executing on the RISC CPU 16a is independent of the PDA CPU and not even defined by the UI client program that provided to operative connection between these two CPUs, 16a, 16b the PDA CPU cannot edit the log 20c, thereby providing a "non-repudiation" record of all communications traffic processed by the adapter 10. For the sake of security, the log may also be stored for use by the server OS as read-only data, while being erasable only by a separate, maintenance OS implemented in another computer device through one of the adapter's communications connectors. The log may also be backed up to a removable write-once read many times (WORM) disc 18d. The WORM is particularly useful if voice or data communications payload is to be stored with the corresponding traffic signals processed by the DSP 14a.

The present invention has been disclosed with reference to particular presently preferred embodiments thereof. However, it will be apparent to one skilled in the art that variations and modifications possible within the spirit and scope of the invention. The invention is defined by the claims appended below.

What is claimed is:

1. A communications adapter for supporting telecommunications operations for a portable device that has a program storage memory, a programmable controller, and a power supply, said communications adapter comprising:

a signal processing unit for converting an analog voice signal to digital data in substantially real-time, said signal processing unit compressing said digital data and arranging the compressed digital data into a plurality of packets, said signal processing unit further arranging a predetermined number of packets into a frame and providing timing and identification indicia to said frame;

a memory unit for storing application interface code that generates a read-only record of said timing and identification indicia such that a non-repudiable communications log is produced and operating system code that encrypts and decrypts said digital data; and a power supply for supplying power to said signal processing unit and for providing supplemental power to said portable device.

2. The communications adapter as claimed in claim 1, wherein said power supply of said communications adapter includes a battery selected from a rechargeable battery and a single-use battery.

3. The communications adapter as claimed in claim 1, wherein said power supply of said communications adapter provides said supplemental power by docking said communications adapter to said portable device.

4. A method for supporting telecommunications operations by a communications adapter for a portable device that has a program storage memory, a programmable controller, and a power supply, said communications adapter comprising a signal processing unit, a memory unit, and a power supply, said method comprising:

converting, by said signal processing unit, an analog voice signal to digital data said in substantially real-time;

compressing, by said signal processing unit, said digital data;

arranging, by said signal processing unit, the compressed digital data into a plurality of packets and a predetermined number of said packets into a frame, said frame including timing and identification indicia;

storing, by said memory unit, application interface code that generates a read-only record of said timing and identification indicia such that a non-repudiable communications log is produced and operating system code that encrypts and decrypts said digital data; and supplying power, by said power supply, to said signal processing unit and to said portable device.

* * * * *